United States Patent Office 3,392,982
Patented July 16, 1968

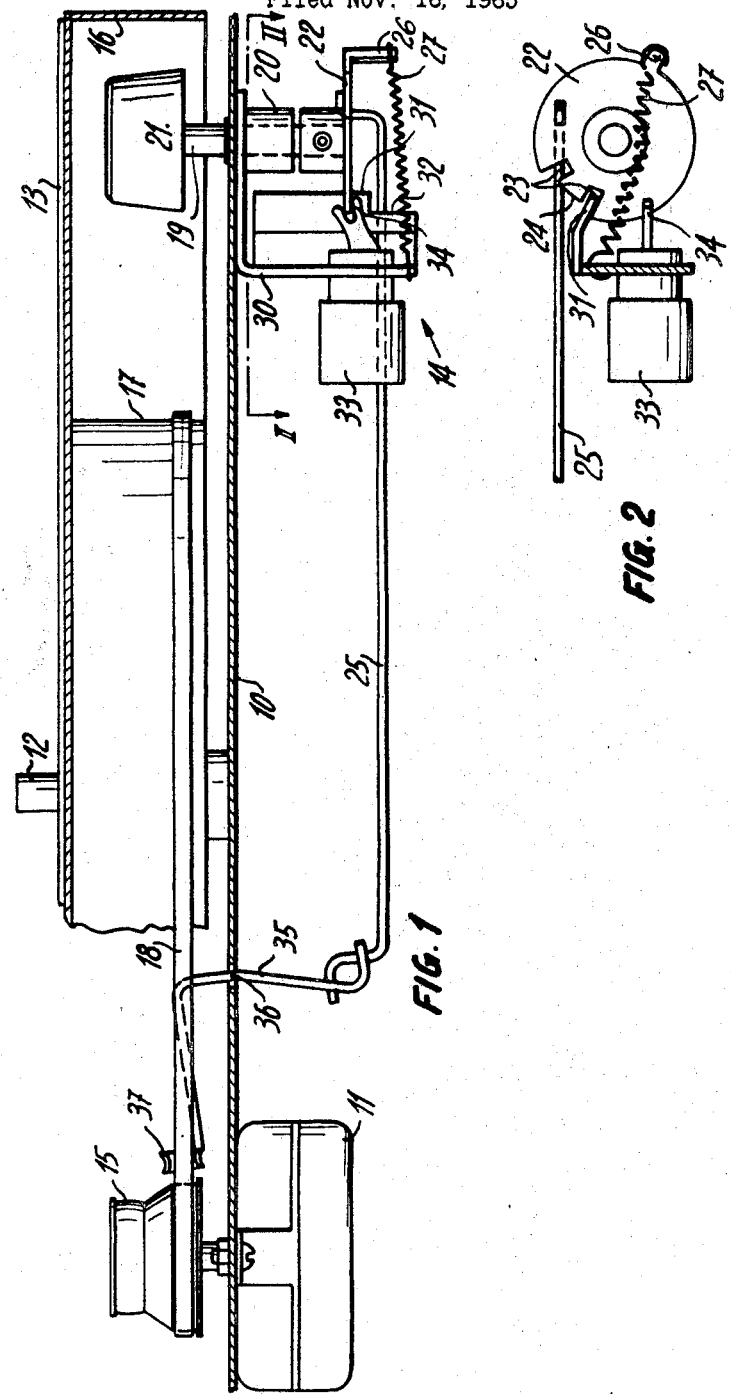

3,392,982
TURNTABLE
Louis Thevenaz, Vaud, Switzerland, assignor to Paillard S.A., Vaud, Switzerland, a corporation of Switzerland
Filed Nov. 16, 1965, Ser. No. 508,095
Claims priority, application Switzerland, Dec. 4, 1964, 15,734/64
4 Claims. (Cl. 274—9)

ABSTRACT OF THE DISCLOSURE

A variable speed phonograph turntable which has a belt-shifting mechanism for changing the transmission ratio, a hand-operated control connected with an electric switch and the belt-shifting mechanism, for effecting the speed change only when the motor is on and for locking the belt-shifting mechanism when the motor is off.

---

The present invention has for its object a phonograph turntable system incorporating a motor driving with a reduced torque, a record-carrying turntable by means of two pulleys connected with each other by an elastic belt, one of said pulleys provided with a plurality of grooves and rigid with the driving shaft of the motor, while the other pulley is rigid with the turntable shaft.

In drive mechanisms for turntables, synchronous motors having a speed of rotation as low as for instance 250 or 375 r.p.m. are being used more frequently than heretofore. The consumption of energy by such motors is very low and this eliminates any risk of humming. Their lower weight and reduced speed produce less vibrations. In contradistinction, the comparatively low torque of such motors, more particularly when they are first started, requires care in the operation of the turntable, so as to ensure its proper operation.

Turntables have already been proposed wherein the modification in speed produced by the shifting from one groove to another is obtained by hand after removing the turntable. Other means for changing the speed also exist, wherein the multi-groove pulley transmits its rotation to an inner bearing of the turntable by means of a rubber-coated roller. Such an arrangement provides a connection which is less adaptable between motor and the turntable than the belt operated arrangement.

In such an arrangement provided with an intermediate roller, the vibrations produced by the motor are transmitted more directly to the turntable.

The torque of the synchronous motor being low when first started, a number of manufacturers have been led to use two synchronous motors, of which one has well-defined pole-pieces, while the other is self-starting.

If only one motor is to be used with a torque which is however to be sufficient for the proper operation of the turntable, it is necessary to provide means to avoid hindering the starting thereof. The object of the present invention is to produce a change speed gear which does not brake the motor in an untimely manner. For instance, if the belt is shifted from one pulley groove to another, by means of a forked member, it is necessary to prevent said operation from being executed when the motor is inoperative, since otherwise the belt would be subjected to a twisting and would be braked considerably by the forked member at the moment of the starting of the motor. Furthermore, said twisting might last a comparatively long time and produce a permanent deformation of the belt.

The turntable according to the invention includes a control system which allows starting and stopping the motor and also changing the transmission ratio, said control system including locking means which prevent any change in the transmission ratio whenever the motor is not operative, so that the belt may always be in a condition which does not prevent the starting of the motor.

The accompanying drawings illustrate by way of example a preferred embodiment of the improved control system for a turntable according to my invention. In said drawings:

FIG. 1 is an elevational view of the turntable arrangement, parts which have been omitted.

FIG. 2 is a cross-section through line II—II of FIG. 1.

The turntable includes a support 10 in which are fitted a synchronous motor 11, a spindle 12 carrying the turntable 13 and a control system 14. A stepped pulley 15 is fitted on the shaft of the synchronous motor, one step of the pulley serving for driving the turntable at a speed of 33 r.p.m. and the other for driving the same at a speed of 45 r.p.m.

The turntable 13 is provided with an outer depending flange 16 which cooperates in increasing the moment of inertia of the turntable, and is also provided with a coaxial cylindrical bearing surface 17 operatively connected with the pulley 15 by means of an elastic belt 18.

The control system 14 includes a vertical shaft 19 adapted to slide vertically inside a bearing 20 and to one end of which is secured a control knob 21, while the other end of same carries a disc 22 rigid therewith.

The disc 22 is provided with two notches 23 (FIG. 2) separated by a concentric section 24 projecting upwardly between them, while a port is formed in the disc 22 for engagement by the end of a rod 25. Said disc also carries a nose 26 to which is secured a spring 27 engaging a stationary point on a square 30 which is rigid with the support 10 and is provided on its depending flange with a vertical nose 31 in which a notch 32 is formed. Said nose 31 and notch 32 are located with reference to the disc 22 in a manner such that when the knob 21 is depressed, the plane defined by the disc 22 registers horizontally with the notch 32, so as to allow the disc 22 to rotate until either of the opposite edges of the notches 23 in the disc engage the nose 31, whereas when the knob 21 is in its raised position, the disc 22 can occupy only one of the two positions for which the nose 31 engages one of the notches 23.

The square 30 carries a switch 33 controlling the motor 11 which is controlled by a jumper or setting lever terminating with a fork 34 cooperating with the disc 22. The rod 25 cooperates at one end with a lever 35 pivotally secured at a point 36 along its length to the support 10 (FIG. 1) while the other end of the lever 35 forms a fork 37 adapted to shift the belt 18 from one step of the pulley 15 to the other.

The operation of the above-described turntable is as follows:

The control knob 21 is held in either of its two extreme vertical positions under the action of the forked setting lever 34 controlling the switch 33. Whereas, in its raised position illustrated in FIG. 1, the knob can occupy only one of the two rotatable positions defined by the notches 23, it can pass from one position to the other when it is lowered and it is held in either one of them by the spring 27 acting as a jumper or a setting lever. The operative condition of the switch 33 is obtained when the disc 22 is in its lower position and consequently the operator can execute a modification in the transmission ratio only when the motor is actually operating. As previously pointed out, depression of knob 21 permits disc 22 to be rotated to occupy selectively either of the notches 23. Since rod 25 is connected at one end to disc 22 and has its other end in engagement with lever 35, rotational movement of the disc 22 imparts longitudinal movement to rod 25 which in turn rocks lever 35 around pivot 36 which vertically displaces the forked end 37 to thereby shift belt 18 to one or the other of the two steps on pulley 15. For example, clockwise rotation of disc 22 moves rod 25 towards the right hand side of the drawing and thus moves the belt 18 to the lower step of the pulley. Counterclockwise movement of the disc 22 moves rod 25 towards the left of the drawing and shifts belt 18 to the upper step of the pulley.

It is also possible to use a synchronous motor having a higher speed or else an asynchronous motor, since such motors may be provided with a speed reducer.

I claim:

1. In a phonograph, including a support, a low torque motor and a turntable mounted on said support, a pulley coaxially rigid with the turntable, another pulley driven by the motor, one of said pulleys being stepped, an elastic belt operatively connecting the other pulley selectively with the different steps of the stepped pulley, the combination of a control system comprising a switch having two positions, one of said positions for energizing and the other for deenergizing the motor, control means including means for shifting the belt into engagement with the desired step of the stepped pulley and including means for controlling the switch, and also including locking means for preventing shifting of the belt as long as the switch is in its motor-deenergizing position.

2. A control system as claimed in claim 1 wherein the control means include a hand-operated member shiftable linearly between a position in which the switch deenergizes the motor and a position in which the switch energizes the motor and also rotatable between first and second positions defining first and second steps of said pulley engaged by the belt, the locking means preventing any rotation of said hand-operated member when in the position for which the motor is deenergized.

3. A control system as claimed in claim 1, wherein the control means includes a rotatable shaft slidable axially between two extreme positions, a hand-operated knob rigid with one end of the shaft, a disc coaxially rigid with the other end of the shaft, a jumper operatively connecting the disc with the switch to make the latter energize and deenergize the motor according to the extreme position occupied by the disc, said belt shifting means including a belt engaging lever mounted on said support, a rod having one end connected to said disc and its opposite end engaging said belt engaging lever and controlling the selective engagement of the belt with the different steps of the stepped pulley, said rod controlled by the rotation of the shaft and the disc rigid therewith, the locking means preventing any rotation of the shaft when in its extreme position in which the motor is deenergized.

4. A control system as claimed in claim 3, wherein said disc has two notches, the locking means comprising a stationary locking member located in such a manner to engage one or the other of said notches when said disc carrying shaft is in its extreme position corresponding to deenergization of the motor.

References Cited

UNITED STATES PATENTS

| | | | |
|---|---|---|---|
| 2,504,529 | 4/1950 | Isom | 74—242.4 |
| 2,927,795 | 3/1960 | Drake | 274—9 |
| 3,315,579 | 4/1967 | Land | 95—10 |

LEONARD FORMAN, *Primary Examiner.*

R. A. FIELDS, *Assistant Examiner.*